3,182,193
ELECTRONICALLY MONITORED LIQUID PURIFICATION OR STERILIZING SYSTEM
Sidney Ellner and Robert W. Marx, Hartsdale, N.Y., assignors to Ultra Dynamics Corp., Elenite Division, New York, N.Y.
Filed Jan. 3, 1962, Ser. No. 174,330
8 Claims. (Cl. 250—43.5)

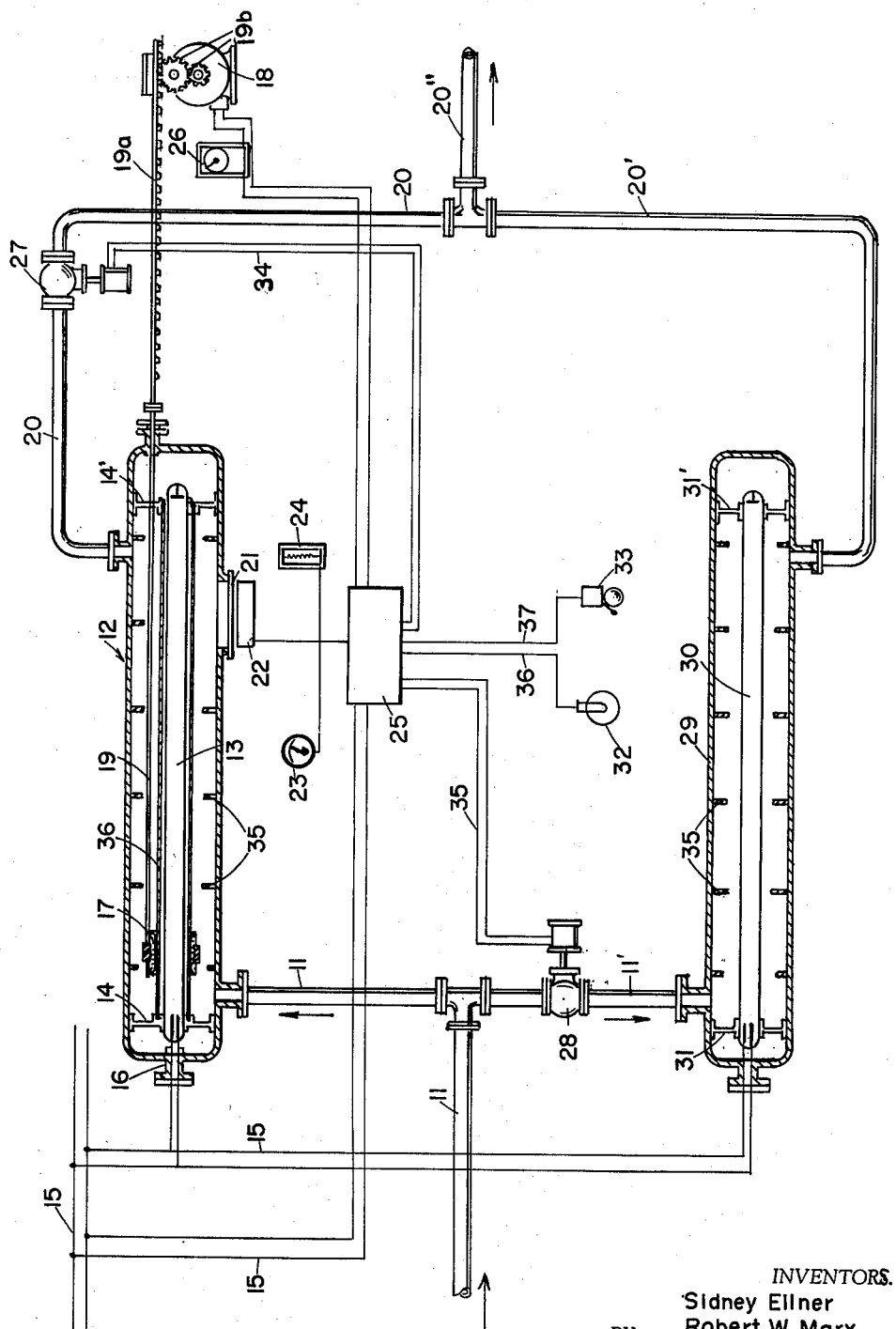

This invention relates to purification and/or sterilizing systems for liquids and fluids in general and to the application of ray-emission means in such systems.

It is known that certain rays of predetermined wave length have remarkable bactericidal, sterilizing, purifying, germicidal and other chemical actinic powers. By reason of the power of destroying, reducing and inhibiting the growth and number of bacteria, yeasts, molds, algae, virus and other micro-organisms or other undesirable germs, light rays of short wave length, preferably at the ultraviolet end of the spectrum, have been used for the sterilization and purification of liquids and fluids.

Devices employing ultraviolet or similar actinic rays for sterilization, purification and the like purposes are known, wherein the ray-emitting means are not in contact with the liquids to be treated; these devices are not too efficient because the intensity of the ray treatment decreases with the increase of the distance of the ray-emitting source from the object. Other devices are used for being inserted temporarily into the liquids to be treated; these devices are different in their application and action from the equipment according to the present invention.

The invention consists in the novel parts, construction arrangements, combinations of parts and improvements as may be shown and described in connection with the apparatus herein disclosed by way of example only and as illustrative of a preferred embodiment. Objects and advantages of the invention will be set forth in part hereafter and in part will be obvious herefrom as may be learned by practicing the invention, the same being realized and attained by means of the instrumentalities and combinations pointed out in the appended claims.

The principal object of the present invention is to eliminate bacteriological and other deleterious micro-organisms from liquids or fluids and to insure safe, continuous, constant and efficient performance of the device.

A further object of the present invention is to design a system to purify certain liquids within specific standards and requirements as determined by the user, the system being monitored by ultraviolet irradiation measuring means such as a meter which activates an electronic circuit and subsequently safety devices (beyond those which are incorporated in standard ultraviolet liquid purification equipment) such as, automatic wiper means, automatic warning signals (visual and/or audible), automatic flow control and automatic flow shut-off.

Another object of the present invention is to provide in combination contrivances or devices in a purifying and/or sterilizing system for continuously monitoring the operation of the system and immediately communicating certain automatic alarms in the event that this system falters or ceases to perform in accordance with its intended purposes.

A further object of the present invention is to provide a purification system designed to monitor instantaneously and continuously ultraviolet radiation imparted to the liquid to be purified at all times, such as in the event that contingencies arise, they will be immediately monitored and subsequently various safety devices will be automatically implemented by direct and automatic communication from the monitoring device.

Among the possible contingencies and/or failures which might arise under any ultraviolet purification system may be mentioned (a) lamp jacket coating and resultant loss of ultraviolet intensity, (b) lamp depreciation or failure, (c) internal circuit failure, (d) line voltage drop or external circuit failure and (e) the unexpected existence of liquid containing characteristics other than that for which a system has been designed.

Yet another object of the present invention is to provide such implements as may be necessary or required for maintaining the irradiation values for the purification of the liquid or fluid to be treated at a safe constant level.

Furthermore, it is an object of this invention to provide in a purifying and/or sterilizing system instruments and automatically operating devices for controlling the flow of the liquid or fluid to be purified in such manner that a constantly safe, monitored and efficient result will be obtained.

A basic ultraviolet liquid purifier receives non-purified liquid into one end of a chamber, usually cylindrical, the passage of this liquid being directed over, around and across one or more ultraviolet lamps, ultraviolet irradiation energy being imparted from the lamp or lamps to the liquid in sufficient quantities and over sufficient duration to kill bacteriological micro-organisms in accordance with the rated capacity. Although a single sterilizing or purifying lamp may be used, the operating unit or system may comprise a bank of germicidal lamps, the germicidal or purifying effect increasing proportionally with any increase in the number of lamps and the latter being determined by the nature, dimensions and contour of the liquid or fluid holding container. The purified liquid is discharged from the sterilization chamber through a pipe or conduit, thus making the same available for its intended use.

Whereas the purpose of a conventional or standard operating system is to eliminate bacteriological micro-organisms from a liquid and to deliver such purified liquid to the user in accordance with the user's requirements, the electronically monitored liquid purification system, according to the invention, is to continually monitor a standard operating system and to immediately communicate certain automatic alarms in the event that this system ceases to perform in accordance with its purposes. In this event, the system will also automatically perform one or both of the following alternate functions, namely, (1) cease to deliver the liquid to the user until it again can deliver liquid in accordance with the user's requirements, (2) institute action necessary for the rectification of any contingency so that the system will either continuously or with short term interruption continue to perform in accordance with the user's requirements.

Various further and more specific purposes, features and advantages will clearly appear from the detailed description given below taken in connection with the accompanying drawing which forms part of this specification and schematically illustrates merely by way of example one embodiment of the device of the invention.

In the following description and in the claims, parts will be identified by specific names for convenience, but such names are intended to be as generic in their application to similar parts as the art will permit. Like reference characters denote like parts in the drawing, illustrating a preferred embodiment by which the invention may be realized.

Liquids or fluids which are to be purified are piped through a pipeline 11 into a preferably stainless steel tubular irradiation chamber 12 in which a lamp 13 as an ultraviolet ray-emitting source is longitudinally disposed. A protective quartz jacket 36, preferably surrounds lamp 13; stainless steel baffles 35 are suitably disposed within chamber 12. In order to maintain the lamp 13 centrally located in the irradiation chamber 12, conventional spacers 14 and 14' are arranged. Power lines 15 are connected to lamp 13 through a sealed orifice 16 of said irradiation chamber. Within the said irradiation chamber and circumposed about lamp 13 is a wiper device 17. Wiper assembly 17, comprises a friction mounted, preferably fabric wiper which is mounted around the periphery of quartz jacket 36. The wiper is connected to rod 19 which is power-operated and activated by the externally located motor 18, for example, through a rack and gear arrangement 19a, 19b.

The purified liquid leaves the irradiation chamber through outlet pipeline 20, 20"; pipe or conduit 20 is welded to chamber 12. Suitably arranged on the side of said irradiation chamber 12 is a window or sight port 21 opposite which an irradiation meter 22 is arranged. Meter 22 is mounted to the inspection sight port 21. This meter can be set and calibrated for a certain desired minimum permissible value of irradiation and it has an indicating instrument 23 and a recording instrument 24 connected with it in the system.

Appropriate electrical circuitry activates the ultraviolet lamps. This circuitry is relatively simple and flexible. It translates any standard electrical output into the electrical energy required to energize the ultraviolet lamps. It applies to electronic circuits which receive electronic or electric impulses from the ultraviolet irradiation meter 22 when instantaneous readings of the meter fall below a "Satisfactory Performance Index." The circuitry translates these impulses upon receipt to certain safety devices of the system.

Ultraviolet irradiation intensities which pass through the sight port 21 are measured and recorded instantaneously by meter 22. Meter 22 also records the readings on a graph in instrument 24 which plots such readings against time. Light energy generated by the ultraviolet lamps, are converted to electrical energy by meter 22. Meter 22 is also equipped with a provision for setting quantitative to electrical energy by the meter. For this purpose irradiation meter 22 is electrically connected with an electronic monitoring device 25. Monitoring device 25 will, upon receiving an impulse from the irradiation meter 22 indicating that the preset minimum permissible irradiation value has been reached, set the wiper motor 18 in motion, which in turn will operate for a predetermined time which has been set on a timer 26. Simultaneously, a solenoid valve 27 in the discharge line 20 is closed, interrupting the flow of the liquid through the irradiation chamber 12, and a second solenoid valve 28 is opened for feeding temporarily the unpurified liquid through conduit or pipeline 11' into an auxiliary or standby irradiation chamber 29 in which an ultraviolet ray-emitting lamp 30, similar to lamp 13, is located and maintained in place by spacers 31 and 31'. Lamp 30 is likewise connected with the main power line 15. The purified liquid leaves irradiation chamber 29 by outlet conduit or pipeline 20' welded to chamber 29 and flows into the main discharge line 20". In order to notify the operating personnel, an alarm or a signal light 32 is switched on and an acoustical signal is given by an audible alarm device 33 which may be a bell or buzzer. The various operating devices are connected with the monitoring device 25 by proper electric conductors 33, 34, 35, 36, 37.

The electronically monitored liquid purification system operates in the following manner.

The liquid to be purified flows through the irradiation chamber 12 where it is subjected to the germ-killing influence of the ultraviolet rays radiated by lamp 13. Obviously, some particles of the unpurified liquid will be deposited on transparent jacket 36 of lamp 13, thus gradually diminishing the intensity of the emission of the radiation. The radiation value, however, is continuously observed, indicated and recorded by the radiation meter 22 through window 21 until a preset safe minimum permissible low value of radiation is reached. At this point, a signal is given to the electronic monitoring device 25 by which immediately wiper 17, power-operated by motor 18, is set in motion in order to clean automatically jacket 36 of lamp 13 for restoring the original radiation effect. The duration of the wiping action may be set by the timing device 26.

Wiper timer 26 is a simple mechanical device which is activated by electronic impulse from the circuitry. When activated, the timer will translate electrical energy during a predetermined time span to the wiper motor 18. This wiper motor is a simple fractional horsepower device which is activated by electrical energy supplied during a short time span by the timer 26. Simultaneously with the setting of the wiper timer 26, the solenoid valve 27 is closed by an impulse given from the monitoring device 25 so that no liquid which is not purified or at least not properly purified can be fed into the discharge line 20. In order to maintain the operation, the solenoid valve 28 is opened so that the liquid is temporarily purified by the auxiliary or standby irradiation chamber 29 of the standby section of the system. After the wiping action has been performed, the monitoring device is reset, solenoid valves are switched to their original setting, and the operation continues as before.

The solenoid valves 27, 28, located in the liquid flow lines 20, 11' may be placed in any convenient location in the system, the alternatives for their number and specific placement location being dependent upon certain criteria of the user of the system. In general, their purpose is to control and/or shut off the flow of liquid when the monitoring device is "notified" of the existence of a contingency or failure. The valve or valves are activated electrically or electronically by the circuitry which has received notification of contingency or failure from the monitoring device.

Obviously, the system comprises at the same time a warning signal, preferably both optical and acoustical, so that the operating personnel recognizes what happens. These are standard, usual and audible warning devices which are placed in appropriate locations so as to transmit their respective alarms. They are activated by electronic signals from the circuitry when either operating and/or standby of the purifier require the implementation of safety devices. The system also has a high degree of safety by which the purification of the liquid is not only protected against a temporary coating of the ultraviolet ray-emitting lamp or its transparent jacket, but also against a depreciation or failure of the lamp, or against an internal circuit failure or a line voltage drop or against the unexpected occurrence of a change in the characteristics of the liquid for which the system had been set.

The significant characteristic of the ultraviolet irradiation purifying system is the absorption of ultraviolet irradiation energy by the liquid. Certain specific quantitative amounts of ultraviolet irradiation must be imparted to the liquid in the given system in order that the system accomplish its purpose.

Every such system presupposes for proper performance a given ultraviolet irradiation "constant." This constant is the quantitative value of ultraviolet irradiation which, after passing through the liquid, is available at the periphery of the sterilizing chamber. This constant must always be exceeded in order for the system to be properly performing in accordance with its designed safety factor (safety factor inherent in design). If and when the system ceases proper performance, ultraviolet irradiation values at the periphery of the chamber will automatically drop below the constant. The purpose of the monitoring device is to continuously and instantaneously record ultraviolet irradiation values at the periphery of the chamber and compare these quantitative values with the constant. This constant is calibrated on the monitoring device by the manual setting of a needle. When the monitor needle falls below the calibrated needle, it is assumed that a contingency has arisen which, if not corrected, will cause the system to perform improperly. Immediately upon recording a substandard reading, the monitoring device activates electric and/or electronic circuitry. This circuitry instantaneously activates an alarm arrangement composed of visual and audible communications to the user's representative. Immediately upon receiving "notification" from the monitoring device, the circuitry also activates (electrically and/or electronically) the following heretofore described alternate safety devices: (a) wiper assembly; (b) solenoid valve shut-off arrangement; (c) solenoid valve of the standby section of the system; and (d) standby operating section of the system. In general, the alternatives for the above safety devices are as follows: (a) wiper assembly activated by wiper motor and time controlled by wiper timer for sixty seconds. This safety device will probably be activated for all alternate arrangements or systems; (b) solenoid valve shut-off arrangement. This alternative will be implemented for users who do not require continuous service but will accept a system whereby a short-term shut-off period is acceptable as an interim required for the rectification; (c) standby solenoid valve arrangement in connection with standby operating section of the system. This arrangement will be implemented as an alternative for users who cannot accept even a short-term shutdown.

It is understood that the transparent jacket 36 may be eliminated if desired and the wiper operated directly upon the envelope of the lamp 13. The jacket and envelope constitute light-transmitting housings of the ultra-violet ray-emitting means. It is further understood that the control, measuring and operating devices and connections are shown in schematic or diagrammatic outline or form only and that the invention is not limited to the particular construction of the device employed herein, but embraces equivalent combinations and/or systems for the intended purposes.

It is further understood that there are several alternatives in relation to the various safety devices which may necessitate implementation in connection with a particular user's requirement. Accordingly, the subject matter contained herein covers a broad aspect of the employment of possible safety devices from which may be derived or to which may be supplemented specific alternate devices in the system for satisfying different criteria of a user.

While the invention has been described and illustrated with respect to a certain particular preferred example which gives satisfactory results, it will be understood by those skilled in the art after understanding the principle of the invention, that various changes and modifications may be made without departing from the spirit and scope of the invention and it is intended therefore in the appended claims to cover all such changes and modifications.

We claim:
1. An electronically monitored fluid purification system, comprising an elongated chamber, said chamber having inlet means for feeding said fluid from a fluid source into said chamber and outlet means for passage of said fluid therefrom, at least one elongated ultraviolet ray-emitting means disposed in said chamber, said ray-emitting means having at least one light-transmitting housing, means for supporting said ray-emitting means within said chamber in spaced relation with respect to the longitudinal inner wall of said chamber permitting said fluid to flow around said housing and in contact therewith, means for wiping said housing, said ray-emitting means being connectable to an electric power source for activating said ray-emitting means for purifying said fluid, a window in said wall of said chamber, a meter having means responsive to ultraviolet irradiation intensities passing through said window, said meter being disposed on the outside of said chamber adjacent said window and being settable to a minimum permissible value of ultraviolet ray emission from said chamber through said window, electronic monitoring means, said meter being connected to said monitoring means, and means energized by said monitoring means for actuating said wiping means when said meter indicates said minimum permissible low irradiation value.

2. An electronically monitored fluid purification system according to claim 1, and warning signal means connected to said monitoring means, said signal means being actuated when said meter indicates said minimum permissible low irradiation value.

3. An electronically monitored fluid purification system according to claim 1, said means for actuating said wiping means including timing means for controlling the duration of the wiping action performed by said wiping means.

4. An electronically monitored fluid purification system according to claim 1, and warning signal means connected to said monitoring means, said signal means being actuated when said meter indicates said minimum permissible low irradiation value, said means for actuating said wiping means including timing means for controlling the duration of the wiping action performed by said wiping means.

5. An electronically monitored fluid purification system according to claim 1, and valve means in said outlet means, a second chamber, at least one ultraviolet ray-emitting means in said second chamber, inlet means for feeding fluid from said fluid source to said second chamber, outlet means for delivering fluid from said second chamber and connecting with said first mentioned outlet means, valve means in said second chamber inlet means, and means energized by said monitoring means for closing said first mentioned valve means and for opening said second valve means when said meter indicates said minimum permissible low irradiation value whereby fluid from said fluid source will flow through said second chamber.

6. An electronically monitored fluid purification system according to claim 5, and warning signal means connected to said monitoring means, said signal means being actuated when said meter indicates said minimum permissible low irradiation value.

7. An electronically monitored fluid purification system according to claim 5, said means for actuating said wiping means including timing means for controlling the duration of the wiping action performed by said wiping means.

8. An electronically monitored fluid purification system according to claim 5, and warning signal means connected to said monitoring means, said signal means being actuated when said meter indicates said minimum permissible low irradiation value, said means for actuating said wiping means including timing means for controlling the duration of the wiping action performed by said wiping means.

References Cited by the Examiner

UNITED STATES PATENTS

| 1,196,481 | 8/16 | Von Recklinghausen et al. 250—45 |
| 1,318,338 | 10/19 | Pole _____ 250—45 |
| 2,051,395 | 8/36 | Robinson et al. _____ 250—45 |
| 2,298,124 | 10/42 | Hartman _____ 250—43.5 |
| 2,667,584 | 1/54 | Rhodes _____ 250—45 |
| 2,670,439 | 2/54 | Darney _____ 250—43 |
| 2,728,859 | 12/55 | Gochenour et al. _____ 250—43 |
| 2,935,611 | 5/60 | Myers _____ 250—45 |
| 3,061,721 | 10/62 | Brenner _____ 250—43 |

RALPH G. NILSON, *Primary Examiner.*

WALTER STOLWEIN, *Examiner.*